United States Patent [19]

Davis et al.

[11] Patent Number: 5,374,411

[45] Date of Patent: Dec. 20, 1994

[54] CRYSTALLINE ALUMINUMPHOSPHATE COMPOSITIONS

[75] Inventors: Mark E. Davis, Blacksburg, Va.; Juan M. Garcés, Midland, Mich.; Carlos H. Saldarriaga, Antioquia, Colombia; Maria Del C. Montes de Correa, Blacksburg, Va.

[73] Assignee: The Dow Chemical Company, Midland, Mich.

[21] Appl. No.: 207,850

[22] Filed: Jun. 15, 1988

Related U.S. Application Data

[63] Continuation-in-part of Ser. No. 90,801, Aug. 28, 1987, abandoned.

[51] Int. Cl.$^5$ .................... C01B 25/12; B01J 29/02
[52] U.S. Cl. .................... 423/306; 423/305; 423/327.1; 502/208; 502/213; 502/214
[58] Field of Search ............ 423/306, 305, 328, 329, 423/330; 502/60, 62, 214

[56] References Cited

U.S. PATENT DOCUMENTS

| | | | |
|---|---|---|---|
| Re. 29,948 | 3/1979 | Dwyer et al. | 208/110 |
| 2,359,344 | 10/1944 | Winding | 196/147 |
| 2,364,015 | 11/1944 | Winding | 23/110 |
| 2,882,243 | 4/1959 | Milton | 252/455 |
| 2,962,355 | 11/1960 | Breck et al. | 23/113 |
| 3,012,853 | 12/1961 | Milton | 23/113 |
| 3,071,434 | 1/1960 | Frilette et al. | 23/113 |
| 3,131,024 | 4/1964 | Leineweber | 23/110 |
| 3,216,789 | 11/1965 | Breck et al. | 23/113 |
| 3,252,757 | 5/1966 | Granquist | 23/111 |
| 3,252,889 | 5/1966 | Capell et al. | 208/120 |
| 3,414,602 | 12/1968 | Acara | 260/448 |
| 3,436,174 | 4/1969 | Sand | 23/113 |

(List continued on next page.)

FOREIGN PATENT DOCUMENTS

| | | |
|---|---|---|
| 0121232 | 3/1984 | European Pat. Off. |
| 146389 | 12/1984 | European Pat. Off. |
| 0146389 | 6/1985 | European Pat. Off. ............ 502/214 |
| 1010382 | 6/1973 | Germany . |

(List continued on next page.)

OTHER PUBLICATIONS

Brown et al., "The In Vitro Activities of Pathogenic Mineral Dusts," Toxicology, vol. 17, No. 2, (1980) pp. 143–147 (Abstract only) (Chem. Abstract 94:25880r).

Flanigen et al., "Aluminophosphate Molecular Sieves and the Periodic Table," EDS, pp. 2–10.

(List continued on next page.)

Primary Examiner—Anthony McFarlane
Attorney, Agent, or Firm—Barbara J. Tribble

[57] ABSTRACT

Crystalline aluminumphosphate compositions having three-dimensional microporous crystal framework structures whose chemical composition expressed in terms of mole ratios is $Al_2O_3:1.0\pm P_2O_5$ are disclosed. These compositions have an X-ray diffraction pattern characterized by d spacings at less than about 40 degrees two-theta as measured using copper K-alpha radiation that are substantially as shown in Table 1. The compositions can further comprise a structure-directing agent. Preparation is by admixing an aluminum source, a phosphorus source and 10–100 moles of water per mole of $Al_2O_3$ to form a precursor mixture, admixing the precursor mixture with the structure-directing agent to form a reaction mixture, and reacting the reaction mixture under conditions such that an aluminumphosphate composition of the given X-ray diffraction pattern is formed. Metal substituted aluminumphosphate compositions having an X-ray pattern with the same characterizing d spacings can also be prepared such that oxides of one or more metals are also incorporated in the oxide lattice. Among the metals suitable for substitution are silicon, magnesium, zinc, tin, zirconium, titanium, cobalt, and mixtures thereof.

Adsorption data shows that the compositions are useful as molecular sieves, having intracrystalline micropores capable of admitting molecules having kinetic diameters of from about 3 to about 14 Angstroms.

38 Claims, 1 Drawing Sheet

U.S. PATENT DOCUMENTS

| | | | |
|---|---|---|---|
| 3,567,372 | 3/1971 | Dueker et al. | 23/111 |
| 3,660,021 | 5/1972 | Olmsted et al. | 23/110 R |
| 3,806,585 | 4/1974 | Takahashi et al. | 423/331 |
| 4,018,870 | 4/1977 | Whittam | 423/329 |
| 4,310,440 | 1/1982 | Wilson et al. | 252/435 |
| 4,440,871 | 4/1984 | Lok et al. | 502/214 |
| 4,452,769 | 6/1984 | Chu et al. | 423/329 |
| 4,542,002 | 9/1985 | Corma et al. | 423/331 |
| 4,554,143 | 11/1985 | Messina et al. | 423/306 |
| 4,556,550 | 12/1985 | Ross et al. | 423/328 |
| 4,557,916 | 12/1985 | Withiam | 423/328 |
| 4,567,029 | 1/1986 | Wilson et al. | 423/306 |
| 4,578,259 | 3/1986 | Morimoto et al. | 423/329 |
| 4,647,442 | 3/1987 | Derouane et al. | 423/306 |
| 4,673,559 | 6/1987 | Derouane et al. | 423/306 |

FOREIGN PATENT DOCUMENTS

| | | |
|---|---|---|
| 55162421 | 6/1979 | Japan . |
| 56096771 | 12/1979 | Japan . |
| 57067021 | 10/1980 | Japan . |
| 1394163 | 2/1972 | United Kingdom . |

OTHER PUBLICATIONS

Horvath, "Method for the Calculation of Effective Pore Size Distribution in Molecular Sieve Carbon," *J. Chem. ENG. of Japan*, vol. 16, No. 6, 1983, pp. 470–475.

Moretti et al. "Zeolite Synthesis in the Presence of Organic Compnents," *Chimica e L'Industria*, vol. 67, Nos. 1–2, Jan.–Feb. 1985.

Neurganokar et al., "Substitutions in the Calcium Sodium Aluminum Silicon Oxide Sulfate ($Ca_2Na_6Al_6Si_6O_{24}(SO_4)_2$) Haueyne Structure," *Mater. Res. Bull.*, vol. 11, No. 1, 1976 pp. 61–65.

Newsam, "The Zeolite Cage Structure," *Science*, vol. 231, 1986, pp. 1093–1099.

Tarte, "Structure Studies on Cement Components II. Isomorphic Substitution in Tricalcium Aluminate," *Silicates Ind.*, vol. 33, (1968) pp. 333–339 (Abstract only) (Chem Abstract 80599k).

Venero et al., "Characterization of Zeolites by Gas Adsorption at Low Pressures," *Mat. Res. Soc. Symp. Proc.*, vol. 111, 1988, pp. 235–240.

CRYSTALLINE ALUMINUMPHOSPHATE COMPOSITIONS

CROSS-REFERENCE TO RELATED APPLICATION

The present application is a continuation-in-part application of U.S. Application Ser. No. 090,801, filed Aug. 28, 1987, now abandoned.

FIELD OF THE INVENTION

The present invention relates to the fields of crystalline aluminumphosphate compositions and in particular to large pore crystalline aluminumphosphate compositions and to a method for their preparation.

BACKGROUND OF THE INVENTION

Molecular sieves have been well known in the art for many years. In general, these may be of two types: the zeolitic type, which comprises crystalline aluminosilicate molecular sieves, and other molecular sieves which are not of this crystalline aluminosilicate composition.

The naturally occurring and synthetic analogues of the zeolites include over a hundred compositions. Zeolites are, by definition, tectosilicates, which means that their framework comprises tridimensional structures made of $SiO_4{}^{-4}$ and $AlO_4{}^{-5}$ tetrahedra which share vertices with oxygen atoms. The zeolites can be characterized as having porous structures with openings of uniform dimensions, ion-exchange capacity; and the capacity to reversibly adsorb and desorb molecules within the cavities present in the crystals via the pore openings. These pore openings are defined by the linkage of $TO_4$ tetrahedra, wherein T represents either silicon or aluminum atoms.

Zeolites are synthesized in general by hydrothermal methods from reactive components in closed systems. A large inventory of empirical data on synthesis compositions and conditions leading to the formation of given zeolites is available in the literature. Practice has shown that a wide variety of zeolitic products can be obtained from the same starting composition, depending on the raw materials, mixing methods, and crystallization procedures employed.

Other crystalline molecular sieves, which are not zeolites, are also well-known. A silica polymorph, which exhibits molecular sieve properties but lacks exchangeable cations, is described in U.S. Pat. No. 4,061,712. This polymorph is known as Silicalite. Crystalline aluminumphosphates with molecular sieve properties representing a new class of adsorbents are described in U.S. Pat. No. 4,310,440. The properties of these aluminumphosphates are somewhat analogous to zeolitie molecular sieves and, therefore, these are useful as catalyst bases or catalysts in various chemical reactions. U.S. Pat. No. 4,440,871 and European Patent Application 0146389 describe crystalline silicoaluminumphosphates with molecular sieve, ion-exchange and catalytic properties analogous to zeolites and/or aluminumphosphate molecular sieves.

Molecular sieve, ion-exchange and catalytic properties, akin to those of zeolites, are also found in certain metallosilicates, in which elements such as beryllium, boron, gallium, iron, titanium, and phosphorus are used as substitutes for the silicon or aluminum. These are described in E. Moretti et el., "Zeolite Synthesis in the Presence of Organic Components," *Chimica e Industria,* 67 (1985) 21-34.

However, all of the crystalline materials described above are known to have free apertures ranging from about 2.1 to about 7.4 Angstroms. The maximum apertures appear to be defined by rings of twelve $TO_4$ tetrahedra. To date, while there have been reports of the synthesis of non-zeolitic molecular sieve compositions having larger apertures, these reports have not been substantiated. For example, U.S. Pat. No. 4,310,440 describes an aluminumphosphate composition referred to as ALPO4-8 (see example 62-A of that patent) which is reported to significantly adsorb perfluorotributylamine, PFTBA [$(C_4F_9)_3N$)]. PFTBA is known to have a kinetic diameter of about 10 A. See R. M. Barter, *Zeolites and Clay Minerals* (1978) 7. A similar claim is made for the zeolite referred to as AG-4 in British Patent 1,394,163. However, neither of these references provides sufficient data to determine definitively whether the PFTBA molecules are adsorbed in the micropores themselves, in capillary pores between the crystalline particles, or perhaps in impurities that are either crystalline or amorphous.

Other materials reported to have large pores are Z-21 described in U.S. Pat. No. 3,567,372, and zeolite N, similar to Z-21, described in U.S. Pat. No. 3,414,602. More recently, Russian workers have claimed a large pore zeolite based on X-ray powder diffraction data. (See "Neorganicheskie Materialy," Izvestiya Akademii Nauk SSSR 17, 6 (June 1981) 1018-1021.)

SUMMARY OF THE INVENTION

Accordingly, there are now provided novel crystalline aluminumphosphate compositions having three-dimensional microporous crystal framework structures whose chemical composition expressed in terms of mole ratios of oxides is $$Al_2O_3 : 1.0 \pm 0.2 P_2O_5;$$

and which are further defined as having an X-ray powder diffraction pattern characterized by d spacings at less than about 40 degrees two-theta as measured using copper K-alpha radiation that are substantially as shown in Table 1.

The present invention further provides novel crystalline aluminumphosphate compositions having three-dimensional microporous crystal framework structures comprising a structure-directing agent, such that the chemical composition expressed in terms of mole ratios is:

$$xR : Al_2O_3 : 1.0 \pm 0.2 P_2O_5;$$

wherein $Al_2O_3$ and $P_2O_5$ form an oxide lattice; R represents a structure-directing agent; and $x>0$; the structures being further defined as having an X-ray powder diffraction pattern characterized by d spacings at less than about 40 degrees two-theta as measured using copper K-alpha radiation that are substantially as shown in Table 1.

The present invention also provides a method of preparing these crystalline aluminumphosphate compositions from a precursor mixture whose chemical composition expressed in terms of mole ratios is $$Al_2O_3 : 1.0 \pm 0.2 P_2O_5 : 10\text{-}100 \, H_2O,$$

further comprising from about 0.02 to about 4.0 moles of a structure-directing agent for each mole of $Al_2O_3$, comprising the steps of admixing an aluminum source, a phosphorus source, and water to form the precursor mixture, admixing the precursor mixture with the structure-directing agent to form a reaction mixture, and reacting the reaction mixture under conditions such that a crystalline aluminumphosphate composition, characterized by d spacings at less than about 40 degrees two-theta as measured using copper K-alpha radiation that are substantially as shown in Table 1, is formed.

The present invention further provides novel crystalline metal substituted aluminumphosphate compositions having three-dimensional microporous crystal framework structures comprising a structure-directing agent, such that the chemical composition expressed in terms of mole ratios is xR:
$Al_2O_3:1.0\pm0.2P_2O_5:0.001-0.5MO_{z/2}:10-100H_2O$;

wherein $Al_2O_3$, $P_2O_5$ and $MO_z/2$ form an oxide lattice; R is a structure-directing agent; x<0; M is a metal; z is the oxidation state of M; and $MO_z/2$ is at least one metal oxide; the chemical composition further comprising one or more charge-compensating species; the structures being further defined as having an X-ray powder diffraction pattern characterized by d spacings at less than about 40 degrees two-theta as measured using copper K-alpha radiation that are substantially as shown in Table 1.

Finally, the present invention provides a method of preparing these crystalline metal substituted aluminumphosphate compositions from a precursor mixture whose chemical composition expressed in terms of mole ratios is $Al_2O_3:1.0\pm0.5P_2O_5:0.001-0.5MO_{z/2}:10-100H_2O$, wherein M is a metal; z is the oxidation state of M; and $MO_z/2$ is at least one metal oxide; the chemical composition further comprising from one or more charge-compensating species and about 0.02 to about 4 moles of a structure-directing agent for each mole of $Al_2O_3$; comprising the steps of admixing an aluminum source, a phosphorus source, a metal oxide source, and water to form a precursor mixture, admixing the precursor mixture with the structure-directing agent to form a reaction mixture, and reacting the reaction mixture under conditions such that a crystalline metal substituted aluminumphosphate composition, characterized by d spacings at less than about 40 degrees two-theta as measured using copper K-alpha radiation that are substantially as shown in Table 1, is formed.

DESCRIPTION OF THE PREFERRED EMBODIMENTS

The compositions of one embodiment of the present invention are synthetic, crystalline aluminumphosphate materials, denoted as "VPI-5", which are capable of reversibly adsorbing and desorbing large molecules, such as triisopropylbenzene, in intracrystalline pores. These materials are comprised of three-dimensional microporous crystal framework structures.

These aluminumphosphate materials can be characterized in a number of ways. In general, the basic chemical composition of the molecular sieves as expressed in terms of mole ratios is $Al_2O_3:1.0\pm0.2P_2O_5$, these compositions having a crystalline structure defined by the X-ray powder diffraction pattern having d spacings substantially as given in Table 1. The term "substantially" as used here means that the d spacings given in Table 1 are within the allowance for experimental error, and thus allow for differences attributable to variances in equipment and technique. The Table shows the characteristic d-spacings of VPI-5 between about three degrees two-theta and about 40 degrees two-theta as measured using copper K-alpha radiation. "Characteristic" and "characterizing" as used herein refer to those d spacings representing all peaks having intensities relative to the largest peak greater than or equal to about 10. These peaks are shown as having intensities described as "vs" for very strong or "m" for medium. Peaks of lesser intensity, described as having weak ("w") intensities, are thus excluded from this definition. The d spacings remain substantially the same after VPI-5 samples are heated to at least about 600° C. This heating can take place, for example, under vacuum, in air, or in air/steam mixtures. The experimental X-ray diffraction patterns were obtained in an automated powder diffraction unit using copper K-alpha radiation.

TABLE 1

| X-Ray Powder Diffraction Data for As-Synthesized VPI-5 | | |
|---|---|---|
| Two-theta (degrees) | d(Å) | $I/I_o$ (%) |
| 5.36 | 16.48 | vs |
| 9.32 | 9.49 | w |
| 10.75 | 8.23 | m |
| 14.35 | 6.17 | m |
| 16.16 | 5.48 | w |
| 18.68 | 4.75 | m |
| 21.66 | 4.10 | m |
| 21.92 | 4.05 | m |
| 22.39 | 3.97 | m |
| 22.56 | 3.94 | m |
| 23.59 | 3.77 | m |
| 24.46 | 3.64 | w |
| 26.12 | 3.41 | w |
| 27.17 | 3.28 | m |
| 28.19 | 3.17 | w |
| 28.96 | 3.08 | w |
| 29.48 | 3.03 | w |
| 30.28 | 2.95 | w |
| 30.88 | 2.90 | w |
| 32.71 | 2.74 | m |
| 34.05 | 2.63 | w |
| 35.86 | 2.50 | w |
| 38.32 | 2.35 | w |

Another characterization of the aluminum-phosphates of the present invention, characterized by the d spacings of the X-ray powder diffraction pattern substantially as shown in Table 1, on the basis of their composition is $xR:Al_2O_3:1.0\pm0.2P_2O_5$ wherein R represents a structure-directing agent used in the synthesis of the large pore material, and x denotes the mole ratio value of R to Al$_2$O$_3$, wherein x>0. Since the structure-directing agent is a part of the preparation process, as discussed below, its amount in the composition will depend in part on whether it has been subjected to partial desorption or decomposition.

In order to better understand the nature of the VPI-5 compositions showing the unique X-ray diffraction pattern described above, adsorption experiments were carried out on samples of VPI-5 previously heated to at least about 350° C. for at least about one hour, and then cooled to room temperature under vacuum. The samples were then exposed to atmospheres of given adsorbates until an equilibrium uptake was obtained. Equilibrium was defined as constant weight of the sample plus adsorbate for at least about 2 hours. The results of these experiments are summarized in Table 2, which includes adsorption data for water, oxygen, nitrogen, cyclohexane, neopentane, and triisopropylbenzene.

That table shows adsorption data for VPI-5 prepared using two different structure directing materials, dipropylamine and tetrabutylammonium hydroxide. It also shows adsorption data for three other reported materials, which are zeolite Y (described in U.S. Pat. No. 3,216,789) and molecular sieves ALPO$_4$-5 and AlPO$_4$-8 (as described in U.S. Pat. No. 3,414,602). From the table it can be inferred that molecules having a kinetic diameter in the range of from about 3 Angstroms to about 14 Angstroms can be admitted into the VPI-5 intracrystalline free micropores.

Figure 1:
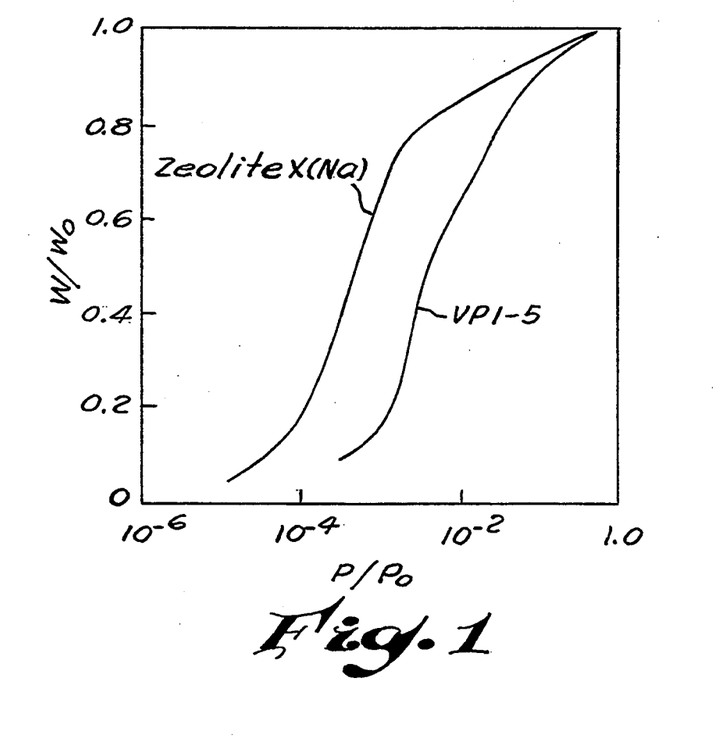
FIG. 1 shows argon adsorption isotherms for the aluminumphosphates of the present invention, denoted "VPI-5" and for Zeolite X(Na), which is used therein for comparison. Zeolite X(Na) is described in U.S. Pat. No. 2,882,244.

Argon adsorption isotherms of Zeolite X(Na), described in U.S. Pat. No. 2,882,244, and VPI-5 aluminumphosphate were determined in an OMNISORP* 360 instrument (*OMNISORP is a trademark of Omitton Technology Corporation) at liquid argon temperature. These are shown in FIG. 1. The adsorption isotherms and the pore size distribution, shown in FIG. 2, were derived using the Horvath-Kawazoe analysis (G. Horvath et al., "Method for the Calculation of Effective Pore Size Distribution in Molecular Sieve Carbon", J. Chem. Eng. of Japan 16, (5) 470–475 (1983)). Zeolite X(Na) is representative of the faujasite structure with pore openings limited by 12-membered ring tetrahedra whose accepted dimension is around 0.8 nm. This dimension is in good agreement with the value shown in FIG. 2. It is evident that VPI-5 has pores substantially larger than Zeolite X(Na).

Figure 2:
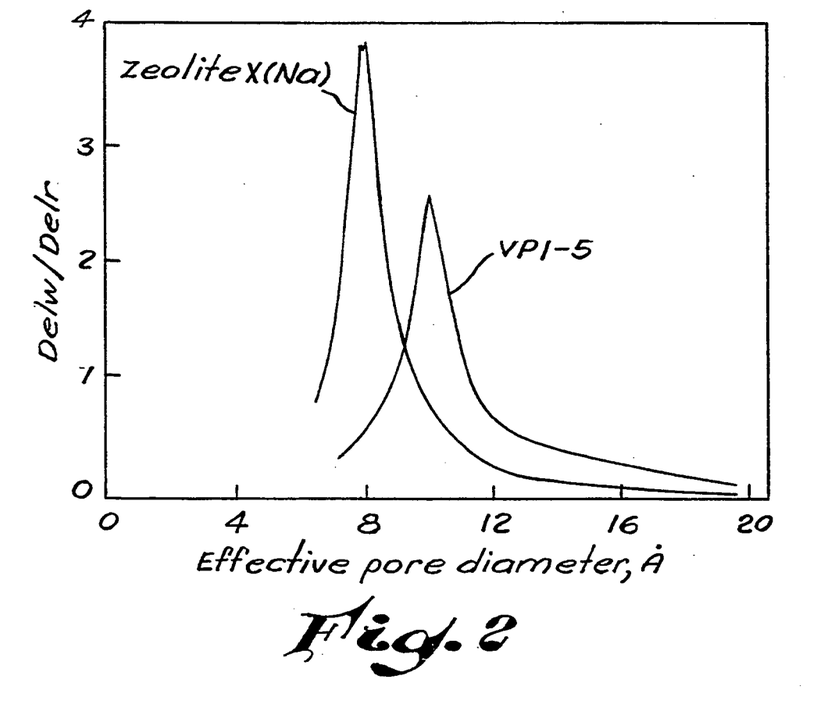
FIG. 2 shows the effective pore diameters in Angstroms for the aluminumphosphates of the present invention, denoted VPI-5, and for Zeolite X(Na).

Thus, from the experiments described above, it is inferred that the VPI-5 compositions exhibit a crystalline structure with a pore system such that some of the pore space is large enough to allow the entry of molecules of triisopropylbenzene. Additional pore space is available to smaller molecules.

The metal substituted aluminumphosphates were also characterized via X-ray diffraction. The observed powder patterns show the same characterizing d spacings as those obtained for the unsubstituted VPI-5, as shown in Table 1. These metal substituted aluminumphosphates show similar molar ratios of Al$_2$O$_3$ to P$_2$O$_5$. In general these compositions are defined by the following molar ratios:

In this formula M is a metal, z is the oxidation state of M, and MO$_{z/2}$ is at least one metal oxide. For example, the formula showing the molar ratios of the silicoaluminumphosphate compositions is:

The structure-directing agent is present in the same proportion for the metal substituted aluminumphosphates as for the unsubstituted aluminumphosphate compositions, and the same choices as to aluminum and phosphorus sources as well as structure directing agents will be applicable. Similarly, the structure-directing agent may or may not remain in the final silicoaluminumphosphate VPI-5 compositions, depending on whether desorption or decomposition has occurred. The chemical composition further comprises one or more charge-compensating for the metal-substituted aluminumphosphates species such that the charges are balanced. These charge-compensating species can be selected from various cations or actions including, for example, sodium, potassium, hydroxides, chlorides, and so forth, as will be known to those skilled in the art.

Other elements from sources capable of forming oxides can also be substituted into the basic VPI-5 alumi-

TABLE 2

| Molecule | Kinetic diameter Å | Pressure Torr. | Temp. °C. | VPI-5[1] made with TBA* cm$^3$/g Adsorbed | VPI-5[1] made with DPrA** | AlPO$_4$-8[2] | AlPO$_4$-5[4] | NaY[3] |
|---|---|---|---|---|---|---|---|---|
| H$_2$O | 2.65 | 18–20 | 23–26 | 0.368 | 0.384 | 0.319 | 0.22 | 0.363 |
| O$_2$ | 3.46 | 100 | liq. N$_2$ | 0.248 | 0.233 | — | — | 0.329 |
|  |  | 100 | liq. O$_2$ | — | — | 0.075 | 0.146 | — |
|  |  | 755 | liq. O$_2$ | — | — | 0.157 | — | — |
| N$_2$ | 3.64 | 100 | liq. N$_2$ | 0.219 | — | — | — | 0.334 |
|  |  | 740 |  | 0.249 | — | — | — | — |
| hexane | 4.30 | 40 | 23–26 | — | 0.191 | — | 0.139 | 0.288 |
| cyclohexane | 6.00 | 65 | 26 | 0.183 | — | — | 0.145 | 0.226 |
| neopentane | 6.20 | 755 | 26 | 0.163 | — | 0.073 | 0.137 | 0.245 |
|  |  | 501 |  |  |  |  |  |  |
| triisopropylbenzene | 8.4–9.5 | vapor pressure | 20–23 | — | 0.150 | — | — | — |

[1]Activated by heating to 350° C. in vacuum overnight.
[2]U.S. Pat. No. 4,310,440
[3]Breck, D. W., Zeolite Molecular Sieves (John Wiley, publisher 1974)
[4]All performed at P/Po = 0.4
*Tetrabutylammonium hydroxide
**Dipropylamine
—Denotes no data numphosphate crystal framework structures without significant effect on the X-ray powder diffraction pattern or general oxide lattice structure. These include, for example, substitute metals such as titanium, tin, cobalt, zinc, magnesium, zirconium, and mixtures thereof.

The present invention also comprises a method of preparing the VPI-5 compositions described herein. In general, the specified mole ratios of the constituent reactants are significant in attaining a final crystalline solid adhering to the above characterizing data. To summarize, the crystalline aluminumphosphates of this invention are prepared by admixing an aluminum source, a phosphorus source, a structure-directing agent, and water to form a reaction mixture, and then reacting the reaction mixture under conditions such that a crystalline aluminumphosphate composition characterized by the d spacings substantially as shown in Table 1 is formed.

The combining of the components can be done in a variety of ways, such that the described VPI-5 compositions are produced. For example, the aluminum source can be admixed with water, and the phosphorus source can be separately admixed with water. The phosphorus source/water admixture can then preferably be added to the aluminum source/water admixture while stirring to ensure homogeneity. It is also possible to add the aluminum source to the phosphorous source/water admixture, or to add an aluminum source/water admixture to a phosphorus source/water admixture. Other mixing orders can also be employed.

Following the preparation of the thoroughly mixed phosphorus source/aluminum source/water precursor mixture, it is preferable to age the precursor mixture sufficiently for its pH to stabilize. This aging can be done with or without stirring, but it is preferred that stirring is not done during the time required to allow pH stabilization. The aging is preferably done at room temperature for a period of from about 1 to about 5 hours.

In preparing the metal substituted aluminumphosphates of the present invention, the metal source can, for example, be preferably added to the aluminum source/phosphorous source/water precursor mixture after it has been aged as described above. It is also possible to add the metal source to an aluminum source/water admixture or to a phosphorus source/water admixture prior to combining the admixtures. It is alternatively also possible to add the metal source in stages at various points in the synthesis.

Starting materials for preparing the aluminumphosphate or metal-substituted aluminumphosphate compositions of the present invention can be selected from a number of possible choices. Possible sources of phosphorus include, for example, elemental phosphorus, orthophosphoric acid ($H_3PO_4$), phosphorus oxide, esters of phosphoric acid, and mixtures of these. Of these, orthophosphoric acid is preferred. Preferred aluminum sources include hydrates of aluminum such as boehmite, pseudo-boehmite, gibbsite, bayerite, and mixtures of these. Elemental aluminum, aluminum alkoxides, aluminum oxides, and mixtures of these are among other possible sources. The phosphorus source and the aluminum source, and in the case of the silicoaluminumphosphate VPI-5, also the silicon source should be such that they are capable of forming an oxide of the metal upon incorporation into the aluminumphosphate lattice. Preferred silicon sources include fumed silica, aqueous colloidal silica, tetraethylorthosilicate, and other reactive silicas. Other silicon-containing compounds can also be used. In other metal substituted embodiments of the present invention, the acetate dihydrates or tetrahydrates of the metals, e.g., cobalt acetate tetrahydrate, zinc acetate dihydrate, or magnesium acetate tetrahydrate, are preferred, but other metal-containing compounds are also possible sources. The metal can also be supplied as a complex ion, such as a metal oxalate, an ethylenediaminetetraacetic acid complex, or the like.

The next step in the synthesis is the addition of the structure directing agent. This is preferably added to the aged precursor mixture. However, it may also be possible to add it at an earlier point in the synthesis. The structure directing agent combined with all of the other starting materials is called the reaction mixture. It is preferable to age this reaction mixture for about 1 to 2 hours again to allow for pH stabilization.

Various effective structure-directing agents are dipropylamine, diisopropylamine, tetrapropylammonium hydroxide, tetrabutylammonium hydroxide, dipentylamine, tripentylamine, tributylamine, alkylammonium and alkylphosphonium compounds in general, and mixtures of these. Of these, dipropylamine, tetrabutylammonium hydroxide and dipentylamine are preferred, and more preferred is tetrabutylammonium hydroxide. Related molecules may also serve as structure directing agents in the present invention.

The proportions of the reactants can be varied within given ranges. Basing proportions on an $Al_2O_3$ molar value of about 1, the structure directing agent ("R") to $Al_2O_3$ molar ratio can be preferably from about 0.02 to about 4, more preferably from about 0.2 to about 2, and most preferably about 1; the $P_2O_5$ to $Al_2O_3$ molar ratio can be preferably from about 0.8 to about 1.2, more preferably from about 0.9 to about 1.1, and most preferably about 1; and the water to $Al_2O_3$ molar ratio can be preferably from about 10 to about 100, more preferably from about 30 to about 70, and most preferably from about 35 to about 55. When silicon or another metal ("M") is added to produce the metal substituted aluminumphosphate of the present invention, the above ratios are still applied, and in addition the $MO_x/2$ to $Al_2O_3$ molar ratio can be preferably from about 0.001 to about 3 moles of metal oxide per mole of $Al_2O_3$. Within this general preferred range there is a distinction between silicon substitution and substitution of most other metals. Thus, it is more preferred that the ratio to $Al_2O_3$ be from about 0.2 to about 0.5 for silicon dioxide, and most preferred that it be from about 0.3 to about 0.4, while it is more preferred that the ratio to $Al_2O_3$ of most other metal oxides be from about 0.001 to about 0.1, and most preferred about 0.02.

In an alternate embodiment of the present invention it is also possible to substitute a polar organic solvent for part of the water. For this purpose an alcohol, such as hexanol, or a ketone or other polar solvent can be employed. In this case it is preferable to dissolve the structure directing agent directly in the solvent prior to incorporating the agent in the oxide admixture.

Once the minimum components of the reaction mixture, i.e., the aluminum source, the phosphorus source, the structure-directing agent, the water and, optionally, the additional metal source, have been combined to form the reaction mixture and this reaction mixture has been preferably aged until a substantially constant pH is attained, the reaction mixture is reacted under conditions such that a crystalline solid having the X-ray powder diffraction pattern by which VPI-5 compositions are defined is formed. For this, known methods of heating are preferably employed. Autoclaving in bombs lined with TEFLON* (*TEFLON is a trademark of Du Pont de Nemours, Inc.) is one effective and convenient means of achieving this. Other types of reactors can alternatively be used. The temperature preferably ranges from about 50° C. to about 200° C., and about 100° C. to about 150° C. is more preferable. The reaction can preferably be carried out under pressure, for example, autogenous pressure, or at atmospheric pressure.

Time of reaction varies, in part depending on the temperature used. Insufficient heating may lead to amorphous products, and excessive heating may result in the formation of amorphous products or undesirable phases A time of about 2 hours to about 50 hours in conjunction with a temperature of about 100° C. to 150° C. is preferred, depending on the reactants and the composition of the reaction mixture.

Following crystallization, the product is preferably subjected to conventional means of separation and recovery. Separation from the mother liquor is conveniently accomplished by filtration, but centrifugation, settling and decantation, and related methods can also be employed. The subsequent recovery of the crystalline VPI-5 compositions can involve traditional washings with acid solutions such as HCl or boric acid, organic solvents, such as acetone or methanol, salt solutions such as magnesium acetate, or deionized water, as well as drying and/or thermal treatment steps. These post-synthesis treatments may help to remove the structure directing agent if desired and may also impart certain physical and chemical properties to the final product. The final crystalline aluminumphosphate compositions will exhibit catalytic, adsorbent ion exchange and/or molecular sieve properties, and may be suitable for catalysis of reactions of various organic compounds.

The following examples are given to more fully show various embodiments of the present invention. They are set forth for illustrative purposes only and are not intended to be, nor should they be construed as being, limitative of the scope of the invention in any way.

EXAMPLE 1

A slurry of 55.0 g of aluminum oxide dihydrate in 150 g of water is added to a solution of 90 g orthophosphoric acid (85 percent $H_3PO_4$) and 100 g water. The resulting precursor mixture is aged without agitation for 2 hours at room temperature. 186 g of 55 percent tetrabutylammonium hydroxide (TBA) is added to the precursor mixture and the resulting mixture is stirred for 2.5 hours at room temperature. The composition of the reaction mixture is:

$$TBA{:}Al_2O_3{:}P_2O_5{:}50H_28130$$

The reaction mixture is heated at 145° C. for 24 hours in a TEFLON*-lined stainless steel autoclave. The product is removed, washed with water, and dried at room temperature overnight. The resulting X-ray diffraction pattern is characterized by d spacings that are substantially as shown in Table 1.

EXAMPLE 2

Seven suspensions of aluminum oxide dihydrate are prepared as listed in Table 3- Each slurry is added to a solution of 11.38 g orthophosphoric acid (85 percent $H_3PO_4$) and 11.0 g water and aged at room temperature 5 hours without stirring. 23.54 g of 55 percent tetrabutylammonium hydroxide (TBA) is added to each precursor mixture with stirring to give the reaction mixture compositions listed in Table 3.

TABLE 3

| $Al_2O_3.2H_2O$ (g) | Composition |
|---|---|
| 6.25 | TBA: $P_2O_5$: 0.90 $Al_2O_3$: 40 $H_2O$ |
| 6.59 | TBA: $P_2O_5$: 0.95 $Al_2O_3$: 40 $H_2O$ |
| 6.73 | TBA: $P_2O_5$: 0.97 $Al_2O_3$: 40 $H_2O$ |
| 6.94 | TBA: $P_2O_5$: 1.00 $Al_2O_3$: 40 $H_2O$ |
| 7.15 | TBA: $P_2O_5$: 1.03 $Al_2O_3$: 40 $H_2O$ |
| 7.29 | TBA: $P_2O_5$: 1.05 $Al_2O_3$: 40 $H_2O$ |
| 7.63 | TBA: $P_2O_5$: 1.10 $Al_2O_3$: 40 $H_2O$ |

The reaction mixtures are heated at 150° C. for 18 hours in TEFLON* lined stainless Steel reactors. The white solids are recovered by slurrying the contents of each reactor with deionized water and allowing the solids to settle. The solids are dried at room temperature in air overnight. The X-ray diffraction pattern of the resulting crystalline materials show a pattern characterized by d spacings that are substantially those of VPI-5.

EXAMPLE 3

About 8.9 g of aqueous orthophosphoric acid (85 percent concentration) is dissolved in about 6.0 g of distilled water. Separately, a slurry is prepared by mixing about 5-3 g of aluminum oxide dihydrate with about 6.0 g of distilled water. The acid solution is then added to the slurry while stirring at room temperature. The resulting precursor mixture is stirred with a magnetic bar for about 20 minutes.

Another solution is prepared by combining about 18.3 g of aqueous 55 percent tetrabutylammonium hydroxide (TBA), and about 10.9 g of distilled water. This solution is then added to the precursor mixture while stirring. Stirring is then continued at room temperature in air for about 1.5 hours. At this point the mixture has the following molar ratio composition:

$$1.0TBA{:}Al_2O_3{:}P_2O_5{:}52H_2O$$

Aliquots of this gel (each about 25 percent of the total) are put into auto,laves lined with TEFLON* of about 15 ml internal capacity and sealed. The autoclaves are heated at about 150° C. for about 44 hours. The resulting product is isolated as described in Example 1.

EXAMPLE 4

About 11.50 g of orthophosphoric acid (85 percent concentration $H_3PO_4$) is dissolved in about 9.8 g water. The solution is stirred for about 5 minutes, and pH is determined to be about 0. This solution is then added to a slurry prepared by stirring 6.875 g of aluminum oxide dihydrate in 20.0 g of water for about 5 minutes. The pH of the slurry prior to admixing it with the acid solution is about 7. The resulting precursor mixture is homogenized, first by hand and then with a magnetic stirrer, and the pH of the reaction mixture is measured over 110 minutes, as shown in Table 4:

TABLE 4

| pH | Time (min.) |
|---|---|
| 0.72 | 0 |
| 1.00 | 15 |
| 1.20 | 30 |
| 1.50 | 45 |

TABLE 4-continued

| pH | Time (min.) |
|---|---|
| 1.60 | 55 |
| 1.70 | 70 |
| 1.70 | 110 |

To the foregoing precursor mixture about 5.075 g of dipropylamine (DPrA) is added while stirring. The resulting white reaction mixture (pH~3.8) is further homogenized for about 82 minutes. The result is a composition which can be expressed in terms of molar oxide ratios as follows:

$$DPrA:Al_2O_3:P_2O_5:40H_2O$$

This reaction mixture is then transferred to five TEFLON* lined stainless steel autoclaves labeled, respectively, 1, 2, 3, 4, and 5, and heated under autogenous pressure at 142° C. for the times specified in Table 5. The pH is measured as to each of the portions and found to be 7.0.

TABLE 5

| Run | Time |
|---|---|
| 1 | 20 hr. |
| 2 | 24 hr. 5 min. |
| 3 | 25 hr. 10 min. |
| 4 | 25 hr. 10 min. |
| 5 | 25 hr. 10 min. |

A white solid is recovered by separately slurrying the contents of each autoclave in deionized water, stirring for several minutes to allow the solid to settle, and discarding the supernatant liquid. This solid is then filtered and dried in an oven at 100° C.

EXAMPLE 5

Five solutions of orthophosphoric acid (85 percent concentration) are prepared as shown in Table 6. Each solution is added dropwise to a slurry of aluminum oxide dihydrate and water. The resulting precursor mixture is heated at the temperature and for the time indicated in Table 6. Dipropylamine, in the amount shown in Table 6, is added dropwise and the resultant reaction mixture is stirred for several minutes.

TABLE 6

| Component | Run 1 (g) | Run 2 (g) | Run 3 (g) | Run 4 (g) | Run 5 (g) |
|---|---|---|---|---|---|
| $Al_2O_3$ | 13.75 | 6.875 | 6.875 | 13.75 | 6.875 |
| $H_3PO_4$ | 23.0 | 11.5 | 11.5 | 23.0 | 11.5 |
| DPrA | 10.15 | 5.075 | 5.075 | 10.15 | 5.07 |
| Water | 59.6 | 29.8 | 29.8 | 59.6 | 29.8 |

Each reaction mixture is then heated at the temperatures and times shown in Table 7 in a stainless TEFLON*-lined autoclave. White solids are recovered by slurrying the contents of each reactor with deionized water and allowing the solids to settle. The solids are then dried at room temperature in air overnight. The X-ray diffraction pattern of each of the resulting crystalline solids is characterized by d spacings that are substantially as shown in Table 1.

TABLE 7

| Synthesis Condition | Run 1 | Run 2 | Run 3 | Run 4 | Run 5 |
|---|---|---|---|---|---|
| Stirring of precursor mixture (min.) | 110 | 60 | 20 | — | 70 |
| Temperature during stirring | ambient | ambient | 55° C. | 60° C. | ambient |
| Stirring of reaction mixture (min.) | 80 | 10 | — | — | 10 |
| pH after stirring | 3.99 | — | — | — | — |
| Heating time (hours) | 24 | 2 | 1 | 20 | 5 |
| Heating temperature °C. | 135 | 145 | 150 | 125 | 142 |

— Denotes no data

The reaction composition of all runs is $$DPrA:Al_2O_3:P_2O_5:37H_2O.$$

EXAMPLE 6

Four solutions of orthophosphoric acid (85 percent $H_3PO_4$) and water are prepared using components as shown in Table 8. Each solution is added dropwise to a slurry of aluminum oxide dihydrate and water, also as shown in that table. The resulting precursor mixtures are stirred and pH is measured. Dipentylamine (DPtA) is added dropwise and each of the resulting reaction precursor mixture(s) is again stirred for the time shown.

TABLE 8

| Component | Run 1 (g) | Run 2 (g) | Run 3 (g) | Run 4 (g) |
|---|---|---|---|---|
| $Al_2O_3$ | 5.3 | 10.6 | 15.75 | 6.875 |
| $H_3PO_4$ | 8.9 | 17.8 | 23.0 | 11.5 |
| DPtA | 7.89 | 15.78 | 15.78 | 7.89 |
| Water | 12 | 36 | 59.6 | 39.8 |

The reaction mixtures are heated in stainless steel TEFLON*-lined autoclaves for periods of time, as shown in Table 9. White solids are recovered by slurrying the contents of each reactor with deionized water and allowing the solids to settle, then washing with acetone. The solids are dried at room temperature in air overnight.

TABLE 9

| Synthesis Condition | Run 1 | Run 2 | Run 3 | Run 4 |
|---|---|---|---|---|
| Stirring of precursor mixture (minutes) | 20 | 60 | — | 70 |
| Temperature during stirring | ambient | ambient | 55° C. | ambient |
| Stirring of reaction mixture (min.) | 4.5 | 3 | 5.5 | 10 |
| pH | — | 1.78* | 1.90** | 1.70* |
| Heating time (hrs.) | — | 20 | 44 | 5 |
| Heating temperature °C. | 150 | 125 | 142 | 142 |

*Denotes precursor mixture
**Denotes reaction mixture

EXAMPLE 7

About 8.9 g of orthophosphoric acid $H_3PO_4$ is dissolved in about 6.0 g of distilled water. Separately, about 5.3 g of aluminum oxide dihydrate is mixed with about 6.0 g of distilled water. The phosphorus-containing mixture is then added to the aluminum-containing mixture, and the resulting precursor mixture is homogenized by stirring with a magnetic bar for about 20 minutes.

About 7.89 g of an aqueous 95 percent dipentyl-amine is then added to the homogenous precursor mixture while stirring, followed by about 10.9 g of distilled water. Stirring of the resulting reaction mixture is continued, at room temperature and in air, for an additional 4.5 hours. The reaction mixture has the following molar ratio composition:

$$DPtA:Al_2O_3:P_2O_5:40H_2O$$

Aliquots (each about 25 percent of the total) of the aged mixture are transferred to autoclaves lined with TEFLON* and heated at 150° C. under autogenous pressure.

The solid products are then separated from the mother liquor by filtration and recovered by slurrying the contents of each autoclave in about 100 ml of distilled water, stirring for several minutes, allowing the solid to settle by gravity, and then discarding the supernatant liquid. Then the solid is filtered and dried in air at 100° C. for about 30 minutes.

EXAMPLE 8

Using the same procedure as in previous examples, solutions of orthophosphoric acid are prepared and then added to slurries of aluminum oxide dihydrate. Amounts of the starting materials are shown in Table 10. Stirring at ambient temperature and heating are carried out as described in Table 12. Aliquots of the reaction mixture are put into autoclaves lined with TEFLON* of about 15 ml internal capacity and sealed. The autoclaves are heated at the temperature and for the time indicated. The resulting products are white solids which are recovered by slurrying the contents of the reactor with deionized water and allowing the solids to settle. This dried at room temperature in air overnight.

EXAMPLE 9

A solution prepared with 8.9 g of orthophosphoric acid (85 percent H3PO4) and 6.0 g of water is added to a slurry of 5.3 g of aluminum oxide dihydrate in 6.0 g of water. This precursor mixture is homogenized for several minutes. A second solution is prepared by adding 18.3 g of aqueous 55 weight percent tetrabutylammonium hydroxide (TBA) and 0.928 g of fumed silica to 10.9 g of water. This second solution is added with mixing and the resulting reaction mixture is homogenized for 90 minutes. The reaction mixture has the following composition:

$$1.0TBA:Al_2O_3:P_2O_5:0.4SiO_2:52H_2O$$

Portions of the mixture are transferred into TEFLON* lined stainless steel autoclaves of 15 ml internal capacity to give approximately 60 percent filling by volume. The autoclaves are heated to 150° C. at autogenous pressure for more than 44 hours. The product is recovered as described in Example 8.

TABLE 10

| Component | Run 1 (g) | Run 2 (g) | Run 3 (g) | Run 4 (g) | Run 5 (g) |
|---|---|---|---|---|---|
| Al2O3 | 5.3 | 11.15 | 11.15 | 11.15 | 5.72 |
| H3PO4 | 8.9 | 17.8 | 17.8 | 17.8 | 8.9 |
| TBA | 18.3 | 36.6 | 36.6 | 36.6 | 18.3 |
| Water | 32.9 | 11.6 | 25.65 | 39.69 | 35 |

TABLE 11

| Synthesis Condition | Run 1 | Run 2 | Run 3 | Run 4 | Run 5 | Run 6 |
|---|---|---|---|---|---|---|
| Aging of precursor mixture (min.) | 60 | 300 | 300 | 300 | 240 | not aged |
| Stirring of reaction mixture (min.) | — | 45 | 45 | 45 | 45 | 90 |
| Heating time | 5 hrs. | 5 days | 5 days | 5 days | 41 hrs. | 44 hrs. |
| Heating temperature °C. | 145 | 150 | 150 | 150 | 150 | 150 |

— Denotes no data

Calculating from the information above it can be seen that there is a range of molar ratios of the reaction composition as follows:

TABLE 12

| Run | Composition |
|---|---|
| 1 | TBA: Al2O3: P2O5: 48 H2O |
| 2 | TBA: Al2O3: P2O5: 20 H2O |
| 3 | TBA: Al2O3: P2O5: 30 H2O |
| 4 | TBA: Al2O3: P2O5: 40 H2O |
| 5 | TBA: Al2O3: P2O5: 50 H2O |

EXAMPLE 10

A solution is prepared with 8.9 g of 85 percent orthophosphoric acid and 6 g of water. This is added to a slurry of 5-3 g of aluminum oxide dihydrate in 6 g of water. This is homogenized for several minutes and 2.5 g of a 40 percent low sodium colloidal silica is added. The resulting gel is aged at room temperature without stirring for one hour. A solution of 10.9 g water and 18.3 g of 55 percent tetrabutylammonium hydroxide is then added. The reaction composition is as follows:

$$TBA:Al_2O_3:P_2O_5:0.4SiO_2:50H_2O$$

The gel is heated at 150° C. for 41 hrs as described in previous examples. The white solid is recovered by slurrying the contents of the reactor with deionized water and allowing the solids to settle. The solid is dried at room temperature in air overnight.

EXAMPLE 11

A solution prepared with 11.5 g of orthophosphoric acid (85 percent H3PO4) and 9.8 g of water is stirred for 20 minutes. A slurry consisting of 6.8 g of aluminum oxide dihydrate and 20 g of water and stirred for 15 minutes. The phosphoric acid solution is then added to the aluminum-containing mixture with stirring. About 0.93 g of fumed silica is then added. The silicoaluminumphosphate precursor mixture is homogenized for 2 hours, and during this time the pH of the mixture increases from 0.9 to 1.6, stabilizing at 1.6.

Next, about 6.87 ml of dipropylamine (DPrA) is added to the mixture with constant agitation. The gel is then further homogenized for 4 more hours. This gel has the oxide composition $DPrA:Al_2O_3:P_2O_5:0.3SiO_2:40H_2O$ Portions of the mixture are transferred to TEFLON* lined autoclaves and heated to 142° C. at autogenous pressure for at least 24 hours. The white solid product is recovered by slurrying the contents of each autoclave in water, stirring for several minutes, allowing the solid to settle and discarding the supernatant liquid. The solid is then filtered and dried in an oven at 100° C.

EXAMPLE 12

About 11.5 g of orthophosphoric acid (85 percent $HBPO_4$) is dissolved in 9.7 g of water and stirred. This solution is added dropwise to a slurry of 6.7 g of aluminumoxide, dihydrate and 20 g of water. The resulting precursor mixture is aged while stirring at room temperature for a period of time as shown in Table 13. At this point an amount of a metal compound as shown in the same table is added with stirring at room temperature. Total stirring time, defined as stirring of the Al-$_2O_3/P_2O_5$ mixture both before and after adding the total compound, is given in the table. Separate reaction mixtures are prepared using magnesium, cobalt, and zinc in according varying proportions. Water proportions are also shown. In all cases water is used. An amount of dipropylamine (DPrA), also as shown in the table, is then added dropwise. The reaction mixture is heated at in a stainless steel TEFLON* lined autoclave for the time shown in the table. The resulting solid is recovered by slurrying the contents of the reactor with deionized water and allowing the solids to settle. The solid is dried at room temperature in air overnight. Specific reactants and process variables are shown in the table.

TABLE 13

|  | Run 1 | Run 2 | Run 3 | Run 4 | Run 5 | Run 6 |
|---|---|---|---|---|---|---|
| Metal Compound | Magnesium acetate | Cobalt acetate | Zinc acetate | Cobalt acetate | Magnesium acetate | Zinc acetate |
| Amount (g) | .21 | .25 | .25 | 0.25 | 0.21 | 0.22 |
| Stirring of precursor mixture (min.) | 60 | 60 | 90 | 135 | 105 | 135 |
| DPrA Amount (ml) | 5.03 | 5.03 | 5.03 | 6.88 | 6.88 | 6.88 |
| Heating time | 5 hrs. | 3 hrs. | 3 hrs. | 24+ Hrs. | 243+ hrs. | 24+ hrs. |
| Temp. | 150° C. | 150° C. | 150° C. | 142° C. | 142° C. | 142° C. |

We claim:

1. Crystalline aluminumphosphate compositions having three-dimensional microporous crystal framework structures whose chemical composition expressed in terms of mole ratios of oxides comprises $Al_2O_3:1.0\pm0.2P_2O_5$;

and having as an optional component from about 0.001 to about 3 moles of at least one oxide of silicon, magnesium, titanium, cobalt, tin or zirconium per mole of $Al_2O_3$, and which is further defined as having an X-ray powder diffraction pattern characterized by d spacings at less than about 40 degrees two-theta as measured using copper K-alpha radiation that are substantially as shown in Table 1, and having an argon adsorption isotherm relative to Zeolite X(Na) substantially as shown in FIG. 1 as "VPI-5".

2. The compositions of claim 1 wherein the $Al_2O_3$ and $P_2O_5$ form an oxide lattice.

3. The compositions of claim 1 further comprising a structure-directing agent.

4. The compositions of claim 3 wherein the structure-directing agent is selected from the group consisting of dipropylamine, diisopropylamine, tetrabutylammonium hydroxide, tetrapropylammonium hydroxide, dipentylamine, tripentylamine, and tributylamine.

5. The compositions of claim 3 wherein the structure-directing agent is selected from the group consisting of dipropylamine, tetrabutylammonium hydroxide, and dipentylamine.

6. The compositions of claim 3 wherein the structure-directing agent is in an amount of from about 0.02 mole to about 4 moles for each mole of $Al_2O_3$.

7. The compositions of claim 3 wherein the structure-directing agent is in an amount of from about 0.2 mole to about 2 moles for each mole of $Al_2O_3$.

8. The compositions of claim 3 wherein the structure-directing agent is in an amount of about 1 mole for each mole of $Al_2O_3$.

9. The composition of claim 1 wherein the $Al_2O_3$, $P_2O_5$ and metal oxide form an oxide lattice.

10. The compositions of claim 1 wherein the X-ray powder diffraction pattern of the compositions after heating to at least 600° C. is characterized by d spacings at less than about 40 degrees two-theta as measured using copper K-alpha radiation that are substantially as shown in Table 1.

11. The crystalline aluminumphosphate compositions of claim 1 having three-dimensional microporous crystal framework structures further comprising a structure-directing agent, such that the chemical composition expressed in terms of mole ratios of oxides includes $xR:Al_2O_3:1.0\pm0.2P_2O_5$:

and having as an optional component from about 0.001 to about 3 moles of at least one metal oxide of silicon, magnesium, titanium, cobalt, tin or zirconium per mole of $Al_2O_3$;

wherein $Al_2O_3$ and $P_2O_5$, and optionally the metal oxide, form an oxide lattice;

R represents a structure-directing agent; and $x>0$.

12. The compositions of claim 11 wherein R is selected from the group consisting of dipropylamine, diisopropylamine, tetrabutylammonium hydroxide, tetrapropylammonium hydroxide, dipentylamine, tripentylamine, and tributylamine.

13. The compositions of claim 11 wherein R is selected from the group consisting of dipropylamine, tetrabutylammonium hydroxide, and dipentylamine.

14. The compositions of claim 11 having intracrystalline micropores such that molecules having a kinetic diameter in the range of from about 3 Angstroms to about 14 Angstroms can be admitted therein.

15. The compositions of claim 14 wherein the molecules are triisopropylbenzene.

16. The compositions of claim 11 wherein the X-ray powder diffraction pattern of the compositions after heating to at least 600° C. is characterized by d spacings at less than about 40 degrees two-theta as measured using copper K-alpha radiation that are substantially as shown in Table 1.

17. The compositions of claim 11 wherein the structure-directing agent can be desorbed.

18. The composition of claim 1 wherein the metal oxide is an oxide of silicon.

19. A method of preparing, from a precursor mixture, crystalline aluminumphosphate compositions having three-dimensional microporouscrystal framework structures such that the chemical composition of the precursor mixture expressed in terms of mole ratios of oxides includes $Al_2O_3:1.0\pm0.2P_2O_5;10-100H_2O,$ having as an optional component from about 0.001 zirconium per mole of $Al_2O_3$ and to about 3 moles of at least one oxide of silicone magnesium, titanium, cobalt, tin or further comprising from about 0.02 to about 4.0 moles of a structure-directing agent for each mole of $Al_2O_3$, the method comprising the steps of:
(1) admixing an aluminum source, a phosphorus source, water and, optionally, a silicon, magnesium, titanium, cobalt, tin and/or zirconium source to form a precursor mixture;
(2) admixing the precursor mixture of step (1) and the structure-directing agent to form a reaction mixture; and
(3) heating the reaction mixture of step (2) under reaction conditions such that a crystalline solid having an X-ray diffraction pattern characterized by d spacings that are substantially as shown in Table 1, and an argon adsorption isotherm relative to Zeolite X(Na) substantially as shown in FIG. 1 as "VPI-5" is formed.

20. The method of claim 19 wherein the mole ratio of $P_2O_5$ to $Al_2O_3$ is about 1.

21. The method of claim 19 wherein the mole ratio of water to $Al_2O_3$ is about 30 to about 70.

22. The method of claim 19 wherein the aluminum source is selected from the group consisting of elemental aluminum, hydrates of aluminum, aluminum oxides, and aluminum alkoxides, and mixtures thereof.

23. The method of claim 19 wherein the aluminum source is a hydrate of aluminum.

24. The method of claim 19 wherein the phosphorus source is selected from the group consisting of orthophosphoric acid, elemental phosphorus, phosphorus oxide, esters of phosphoric acid, and mixtures thereof.

25. The method of claim 19 wherein the structure-directing agent is selected from the group consisting of dipropylamine, diisopropylamine, tetrabutylammonium hydroxide, tetrapropylammonium hydroxide, dipentylamine, tripentylamine, and tributylamine.

26. The method of claim 19 wherein the structure-directing agent is selected from the group consisting of dipropylamine, tetrabutylammonium hydroxide, and dipentylamine.

27. The method of claim 19 wherein the compositions have intracrystalline free micropores such that molecules having a kinetic diameter in the range of from about 3 Angstroms to about 14 Angstroms can be admitted therein.

28. The method of claim 19 wherein the molecules are triisopropylbenzene.

29. The method of claim 19 wherein the heating is done at a temperature in the range of from about 50° C. to about 200° C.

30. The method of claim 19 wherein the heating is done for a time period of from about 1 hour to about 10 days.

31. The method of claim 19 wherein the crystalline solid is separated from a mother liquor and recovered by conventional means.

32. The method of claim 19 wherein the aluminum source and a portion of the water are mixed separately and the phosphorus and a second portion of the water are mixed separately, and then the two mixtures are combined to form the precursor mixture.

33. The method of claim 19 wherein the precursor aged from about 1 hour to about 5 hours.

34. The method of claim 19 wherein the reaction mixture is aged sufficiently such that a substantially constant pH is reached.

35. The method of claim 19 wherein a silicon source is used.

36. The method of claim 35 wherein the precursor mixture comprises from about 0.1 to about 1 mole of silicon dioxide.

37. The method of claim 35 wherein the silicon source is selected from the group consisting of fumed silica, aqueous colloidal silica, tetraethylorthosilicate, and mixtures thereof.

38. The method of claim 19 wherein the crystalline solid is subjected to at least one post-synthesis treatment selected from the group consisting of washing with an acid solution, a salt solution, an organic solvent or deionized water; drying; and thermal treatment.

* * * * *